US012671611B2

(12) United States Patent
Lee et al.

(10) Patent No.: US 12,671,611 B2
(45) Date of Patent: Jun. 30, 2026

(54) METHOD AND APPARATUS FOR CHANNEL ESTIMATION IN COMMUNICATION SYSTEM

(71) Applicant: Electronics and Telecommunications Research Institute, Daejeon (KR)

(72) Inventors: An Seok Lee, Daejeon (KR); Yong Jin Kwon, Daejeon (KR); Han Jun Park, Daejeon (KR); Heesoo Lee, Daejeon (KR); Yun Joo Kim, Daejeon (KR); Hyun Seo Park, Daejeon (KR); Jung Bo Son, Daejeon (KR); Yu Ro Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 626 days.

(21) Appl. No.: 18/323,258

(22) Filed: May 24, 2023

(65) Prior Publication Data

US 2023/0388160 A1    Nov. 30, 2023

(30) Foreign Application Priority Data

May 24, 2022    (KR) ........................ 10-2022-0063753
May 24, 2023    (KR) ........................ 10-2023-0066792

(51) Int. Cl.
*H04L 25/02*    (2006.01)
*G06N 3/0442*    (2023.01)

(52) U.S. Cl.
CPC ....... *H04L 25/0254* (2013.01); *G06N 3/0442* (2023.01); *H04L 25/0224* (2013.01)

(58) Field of Classification Search
CPC ............. H04L 25/0254; H04L 25/0224; H04L 25/0204; G06N 3/0442; G06N 3/0464; G06N 3/045; G06N 3/08
See application file for complete search history.

(56) References Cited

U.S. PATENT DOCUMENTS 10,631,285 B2    4/2020    Lee
11,051,200 B2    6/2021    Lee et al.
2018/0189643 A1    7/2018    Kim et al.
2018/0189655 A1    7/2018    Oh et al.
2020/0382975 A1    12/2020    Jo et al.
(Continued)

FOREIGN PATENT DOCUMENTS

WO    2022/000365 A1    1/2022

OTHER PUBLICATIONS

Dosovitskiy et al. An Image is Worth 16x16 Words: Transformers For Image Recognition At Scale. ICLR 2021. pp. 1-21.

*Primary Examiner* — Natasha W Cosme

(74) *Attorney, Agent, or Firm* — KILE PARK REED & HOUTTEMAN PLLC

(57) ABSTRACT

An operation method of a receiver may comprise: receiving reference signals from a transmitter in an entire use band; generating first channel information by performing channel estimation on each of the reference signals; generating second channel information by removing noises from the first channel information using a first artificial neural network; and generating third channel information for a grid of the entire use band based on the second channel information using a second artificial neural network.

20 Claims, 12 Drawing Sheets

200

(56) References Cited

U.S. PATENT DOCUMENTS

| | | |
|---|---|---|
| 2020/0396575 A1* | 12/2020 | Kim ......................... G06N 3/04 |
| 2021/0119681 A1 | 4/2021 | Seo et al. |
| 2021/0119713 A1 | 4/2021 | O'Shea et al. |
| 2021/0328631 A1 | 10/2021 | Luo et al. |
| 2021/0399924 A1 | 12/2021 | Amjad et al. |

* cited by examiner

FIG. 2

METHOD AND APPARATUS FOR CHANNEL ESTIMATION IN COMMUNICATION SYSTEM

CROSS-REFERENCE TO RELATED APPLICATIONS

This application claims priority to Korean Patent Applications No. 10-2022-0063753, filed on May 24, 2022, and No. 10-2023-0066792, filed on May 24, 2023, with the Korean Intellectual Property Office (KIPO), the entire contents of which are hereby incorporated by reference.

BACKGROUND

1. Technical Field

Exemplary embodiments of the present disclosure relate to a technique for channel estimation in a communication system, and more specifically, to a technique for channel estimation in a communication system, which facilitates machine learning-based channel estimation in a terminal.

2. Related Art

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, a communication system may use machine learning for channel estimation. An artificial neural network used for machine learning may typically be a multilayer perceptron (MLP). However, the MLP may be difficult to efficiently process complex input information. In addition, a dimension of sizes of inputs for the MLP may be predetermined. Accordingly, the MLP cannot support inputs of various sizes.

SUMMARY

Exemplary embodiments of the present disclosure are directed to providing a method and an apparatus for channel estimation in a communication system, which apply different artificial neural networks to respective steps by subdividing a channel estimation process into the respective steps.

According to a first exemplary embodiment of the present disclosure, an operation method of a receiver may comprise: receiving reference signals from a transmitter in an entire use band; generating first channel information by performing channel estimation on each of the reference signals; generating second channel information by removing noises from the first channel information using a first artificial neural network; and generating third channel information for a grid of the entire use band based on the second channel information using a second artificial neural network.

The operation method may further comprise: receiving data transmitted from the transmitter using the third channel information.

The generating of the second channel information may comprise: generating first latent variables of the reference signals by embedding the first channel information for each of the reference signals and position information for each of the reference signals, the first latent variables having a predetermined dimension; removing noises from the first channel information by converting the first latent variables of the reference signals into first output latent variables using the first artificial neural network; and generating the second channel information from the first output latent variables.

The generating of the first latent variables may comprise: obtaining a channel information sequence for each of the reference signals from the first channel information for each of the reference signals; obtaining a positional encoding value from the position information for each of the reference signals; and generating the first latent variables by adding and embedding the positional encoding value to the channel information sequence.

The first latent variables may be generated with reference to additional information, and the additional information may include at least one of a signal-to-noise ratio (SNR) of a signal received by the receiver from the transmitter, a delay spread, a Doppler frequency, a radio channel propagation environment, or a moving speed of the receiver which is estimated from the received signal, or a combination thereof.

The removing of the noises from the first channel information may comprise: generating self-attention-operated first latent variables by performing self-attention operations on the first latent variables using the first artificial neural network; generating residual-connected first latent variables by adding the self-attention-operated first latent variables and the first latent variables using the first artificial neural network; generating the first output latent variables by feed-forwarding the residual-connected first latent variables through a nonlinear activation function using the first artificial neural network, thereby removing noises from the first channel information; and generating residual-connected first output latent variables by adding the residual-connected first latent variables and the first output latent variables using the first artificial neural network.

The generating of the self-attention-operated first latent variables may comprise: dividing the first latent variables into a plurality of latent variable groups using a window; and generating the self-attention-operated first latent variables by performing self-attention operations with the respective plurality of latent variable groups as unit inputs using the first artificial neural network.

The generating of the self-attention-operated first latent variables may comprise: dividing the first latent variables into a plurality of latent variable groups using a window; generating average latent variables based on averages of the respective plurality of latent variable groups; generating self-attention-operated average latent variables by performing self-attention operations on the average latent variables using the first artificial neural network; and generating the self-attention-operated first latent variables by performing compensation on the self-attention-operated average latent variables.

The removing of the noises from the first channel information may comprise: generating long short term memory (LSTM)-operated first latent variables by performing LSTM operations on the first latent variables in both forward and backward directions using the first artificial neural network; generating residual-connected first latent variables by adding the LSTM-operated first latent variables and the first latent variables using the first artificial neural network; generating the first output latent variables by feed-forwarding the residual-connected first latent variables through a nonlinear activation function using the first artificial neural network, thereby removing noises from the first channel information; and generating residual-connected first output latent variables by adding the residual-connected first latent variables and the first output latent variables using the first artificial neural network.

The generating of the third channel information may comprise: dividing the grid of the entire use band into patches; generating second latent variables of the patches by embedding the noise-removed second channel information and position information for each of the patches in units of a patch, the second latent variables having a predetermined dimension; generating channel information of the patches by converting the second latent variables into second output latent variables using the second artificial neural network; and generating the third channel information for the grid by de-embedding the second output latent variables.

The generating of the second latent variables may comprise: obtaining a channel information sequence for each of the patches from the second channel information for each of the patches; obtaining a positional encoding value from the position information for each of the patches; and generating the second latent variables by adding and embedding the positional encoding value to the channel information sequence.

The generating of the channel information of each of the patches may comprise: generating self-attention-operated second latent variables by performing self-attention operations on the second latent variables using the second artificial neural network; generating residual-connected second latent variables by adding the self-attention-operated second latent variables and the second latent variables using the second artificial neural network; and generating the second output latent variables by feed-forwarding the residual-connected second latent variables through a nonlinear activation function using the second artificial neural network, thereby generating the channel information of each of the patches.

The generating of the channel information of each of the patches may comprise: generating LSTM-operated second latent variables by performing LSTM operations on the second latent variables in both forward and backward directions using the second artificial neural network; generating residual-connected second latent variables by adding the LSTM-operated second latent variables and the second latent variables using the second artificial neural network; and generating the second output latent variables by feed-forwarding the residual-connected second latent variables through a nonlinear activation function using the second artificial neural network, thereby generating the channel information of each of the patches.

According to a second exemplary embodiment of the present disclosure, a receiver may comprise a processor, and the processor may causes the receiver to perform: receiving reference signals from a transmitter in an entire use band; generating first channel information by performing channel estimation on each of the reference signals; generating second channel information by removing noises from the first channel information using a first artificial neural network; and generating third channel information for a grid of the entire use band based on the second channel information using a second artificial neural network.

In the generating of the second channel information, the processor may further cause the receiver to perform: generating first latent variables of the reference signals by embedding the first channel information for each of the reference signals and position information for each of the reference signals, the first latent variables having a predetermined dimension; removing noises from the first channel information by converting the first latent variables of the reference signals into first output latent variables using the first artificial neural network; and generating the second channel information from the first output latent variables.

In the removing of the noises from the first channel information, the processor may further cause the receiver to perform: generating self-attention-operated first latent variables by performing self-attention operations on the first latent variables using the first artificial neural network; generating residual-connected first latent variables by adding the self-attention-operated first latent variables and the first latent variables using the first artificial neural network; generating the first output latent variables by feed-forwarding the residual-connected first latent variables through a nonlinear activation function using the first artificial neural network, thereby removing noises from the first channel information; and generating residual-connected first output latent variables by adding the residual-connected first latent variables and the first output latent variables using the first artificial neural network.

In the generating of the self-attention-operated first latent variables, the processor may further cause the receiver to perform: dividing the first latent variables into a plurality of latent variable groups using a window; and generating the self-attention-operated first latent variables by performing self-attention operations with the respective plurality of latent variable groups as unit inputs using the first artificial neural network.

In the generating of the self-attention-operated first latent variables, the processor may further cause the receiver to perform: dividing the first latent variables into a plurality of latent variable groups using a window; generating average latent variables based on averages of the respective plurality of latent variable groups; generating self-attention-operated average latent variables by performing self-attention operations on the average latent variables using the first artificial neural network; and generating the self-attention-operated first latent variables by performing compensation on the self-attention-operated average latent variables.

In the removing of the noises from the first channel information, the processor may further cause the receiver to perform: generating long short term memory (LSTM)-operated first latent variables by performing LSTM operations on the first latent variables in both forward and backward directions using the first artificial neural network; generating residual-connected first latent variables by adding the LSTM-operated first latent variables and the first latent variables using the first artificial neural network; generating the first output latent variables by feed-forwarding the residual-connected first latent variables through a nonlinear activation function using the first artificial neural network, thereby removing noises from the first channel information;

and generating residual-connected first output latent variables by adding the residual-connected first latent variables and the first output latent variables using the first artificial neural network.

In the generating of the third channel information, the processor may further cause the receiver to perform: dividing the grid of the entire use band into patches; generating second latent variables of the patches by embedding the noise-removed second channel information and position information for each of the patches in units of a patch, the second latent variables having a predetermined dimension; generating channel information of the patches by converting the second latent variables into second output latent variables using the second artificial neural network; and generating the third channel information for the grid by de-embedding the second output latent variables.

According to the present disclosure, a channel estimation apparatus may perform channel estimation with low complexity using an artificial neural network and may not require channel covariance matrix information. In addition, according to the present disclosure, the channel estimation apparatus may subdivide a channel estimation process into a plurality of steps, and apply a different artificial neural network to each of the steps to perform efficient channel estimation operations, so that improved performance can be achieved.

BRIEF DESCRIPTION OF DRAWINGS

FIG. 2 is a block diagram illustrating a first exemplary embodiment of a communication node constituting a communication system.

DETAILED DESCRIPTION OF THE EMBODIMENTS

Figure 1:
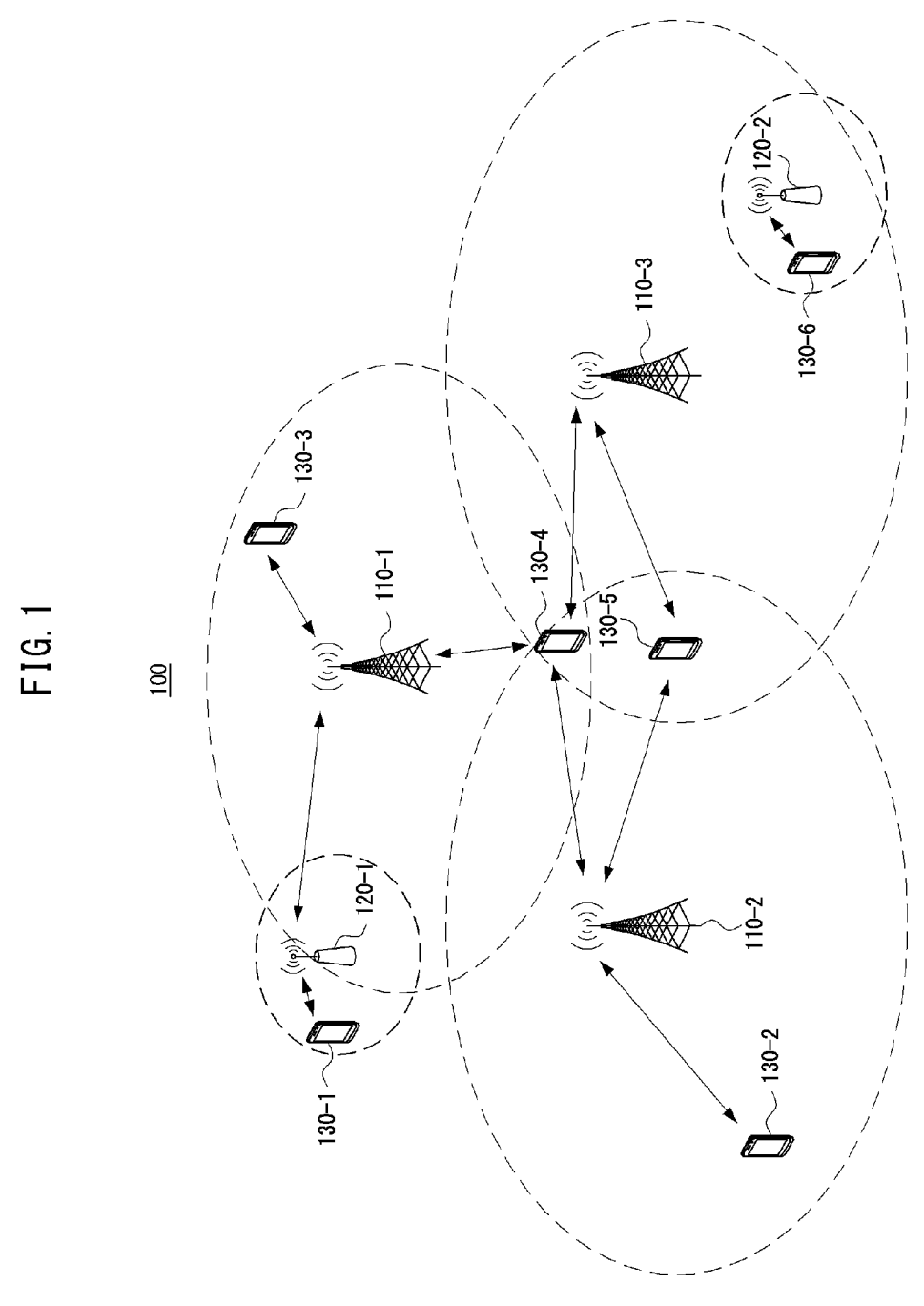
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
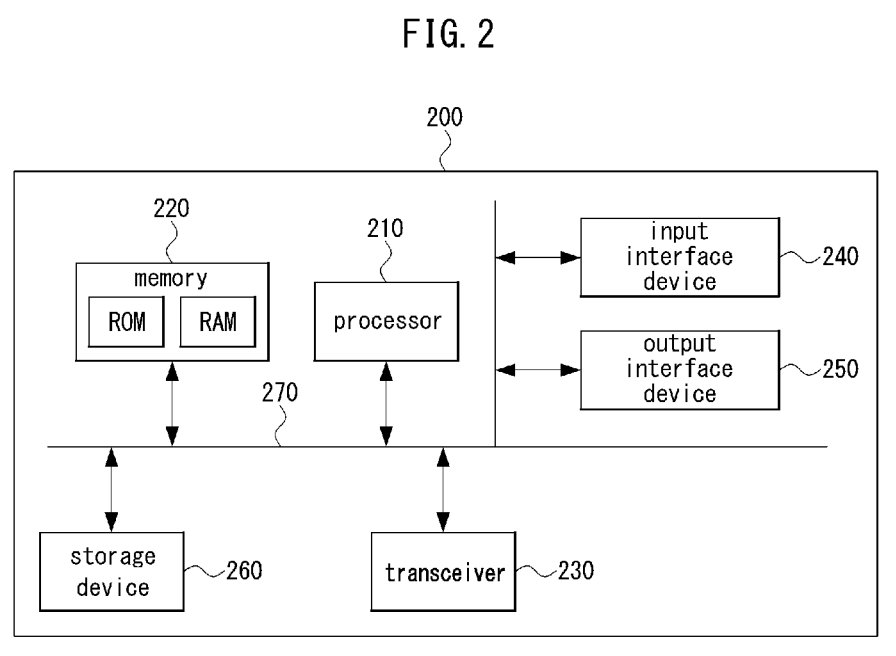

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, a mobile communication network may require a precise channel estimation technique for reliable reception of radio transmission signals. In the mobile communication technologies up to the fourth generation (4G), a terminal may perform channel estimation through cell-specific common reference signals. However, in the mobile communication technologies from the 4G to the current fifth generation (5G), a terminal may perform channel estimation through demodulation reference signals (DMRSs) for reception for each terminal.

In channel estimation using such the reference signals, the terminal may perform channel estimation using a linear minimum mean squared error (MMSE) technique or a least square (LS) technique. The linear MMSE technique may use an estimated correlation matrix between a reference signal resource and a target resource for channel estimation. However, the terminal may require high computational complexity to obtain such the estimated correlation matrix. In this regard, the LS technique may be widely used due to its lower complexity. However, the LS technique may have relatively low channel estimation performance. As described above, the linear MMSE technique and the LS technique each have advantages, but they may also have disadvantages.

In order to solve the disadvantages of the linear MMSE technique and the LS technique, a communication system may use machine learning for channel estimation. The artificial neural network used for the machine learning may typically be a multilayer perceptron (MLP) and a convolution neural network (CNN). Here, the MLP may be said to be the simplest artificial neural network and may be widely used in various applications. The MLP may be the most basic form of a feed forward neural network (FFNN). The FFNN may be a neural network in which an operation direction is determined in only one direction from an input layer to an output layer.

However, the MLP may be difficult to efficiently process complex input information. In addition, a dimension of sizes of inputs in the MLP may be predetermined. Accordingly, the MLP cannot support inputs of various sizes. To solve this problem, a receiver may require various artificial neural network models according to different resource sizes in order to perform channel estimation based on the MLP-based artificial neural network.

The CNN may efficiently process multi-dimensional information, particularly 2-dimensional image information. Accordingly, the CNN may be widely used in image processing and the like. Regarding channel estimation, a fully CNN (FCN) that does not include any MLP layer may process a variable input into a variable-sized output unlike the MLP.

The present disclosure may provide a channel estimation technique for accurately estimating a channel variation using reception information of reference signals including the channel variation and noises. The channel estimation technique of the present disclosure may perform channel estimation with low complexity using an artificial neural network, and may not require separate channel information (e.g., estimated correlation matrix information between a reference signal resource and a target resource, channel covariance matrix information, and/or the like). In contrast, the MMSE technique has high complexity and may require channel covariance matrix information in advance.

In addition, the channel estimation technique of the present disclosure may perform an efficient operations by subdividing a channel estimation process into a plurality of steps and separately applying an artificial neural network to each of the steps. Accordingly, the channel estimation technique of the present disclosure can achieve improved performance. In addition, the channel estimation technique of the present disclosure can support different reception resource sizes in one artificial neural network model.

Meanwhile, a receiver may use the channel estimation technique of the present disclosure to receive radio transmission signals. The channel estimation technique of the present disclosure may be mainly used by a receiver in a terminal to receive downlink transmissions of a wireless cellular network. However, the channel estimation technique of the present disclosure may be used also in a reception procedure for uplink transmissions. In addition, the channel estimation technique of the present disclosure may be used in various configurations of wireless networks such as relays. In the present disclosure, a term 'network' may mainly refer to a base station. In addition, the term 'network' may refer to one or more servers present in a mobile communication core network accessible through the base station.

Figure 3:
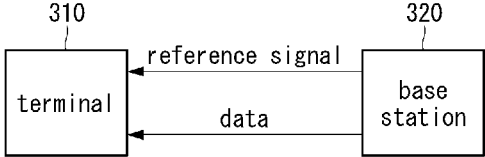
FIG. 3 is a conceptual diagram illustrating a first exemplary embodiment of a channel estimation apparatus in a communication system.

FIG. 3 is a conceptual diagram illustrating a first exemplary embodiment of a channel estimation apparatus in a communication system.

Referring to FIG. 3, a base station 320 may transmit reference signals to a terminal 310. The terminal 310 may receive the reference signals from the base station, and the terminal 310 may generate channel estimation information by estimating a channel for each reference signal. Here, the channel estimation information for the reference signal may be channel information for the reference signal. Thereafter, the terminal may remove (or cancel) noise components from the channel information for each reference signal using a first artificial neural network. In addition, the terminal may use a second artificial neural network to generate channel information of the entire grid of a use band from the channel information from which noise components have been removed. Here, the channel information of the entire grid may be channel estimation information of the entire grid. Here, the first artificial neural network may be an artificial neural network that has been trained to remove noise components from the channel information of the reference signal. In addition, the second artificial neural network may be an artificial neural network that has been trained to estimate the channel information of the entire grid of the use band from the channel information for the reference signal.

Meanwhile, the base station may transmit data to the terminal. The terminal may receive the data transmitted from the base station by using the generated channel information of the entire grid of the use band.

Figure 4:
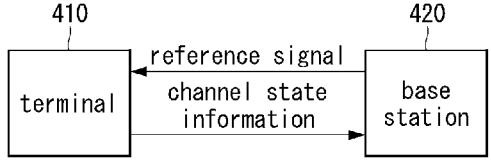
FIG. 4 is a conceptual diagram illustrating a second exemplary embodiment of a channel estimation apparatus in a communication system.

FIG. 4 is a conceptual diagram illustrating a second exemplary embodiment of a channel estimation apparatus in a communication system.

Referring to FIG. 4, a base station 420 may transmit reference signals to a terminal 410. The terminal 410 may receive the reference signals from the base station, and the terminal 410 may generate channel estimation information for each reference signal. Here, the channel estimation information for the reference signal may be channel information for the reference signal. Thereafter, the terminal may remove (or cancel) noise components from the channel information for each reference signal using a first artificial neural network. In addition, the terminal may use a third artificial neural network to generate channel state information from the channel information from which noise components have been removed.

Thereafter, the terminal may transmit the generated channel state information to the base station. The base station may receive the channel state information from the terminal, and may determine a channel state using the received channel state information. Here, the channel information is information related to a radio channel and may be the channel estimation information. In addition, the channel estimation information may refer to channel information estimated using the reference signal at the terminal. The channel state information is information related to a quality of a radio channel and may mean a rank indicator (RI), a channel quality indicator (CQI), a precoding matrix indicator (PMI), and the like. Here, the first artificial neural network may be an artificial neural network that has been trained to cancel noise components from the channel information of the reference signal. In addition, the third artificial neural network may be an artificial neural network that has been trained to generate the channel state information from the channel information for each reference signal.

A channel estimation process in the present disclosure may be largely composed of two steps. The first step may be a step of obtaining channel estimation information of reference signals by using the reference signals. The second step may be a step of obtaining channel estimation information of all resources by estimating channels of all resources using the channel estimation information of the reference signals. The channel estimation information of the reference signal in the first step may be channel information of the reference signal, and the channel estimation information of all resources in the second step may be channel information for all resources.

Figure 5:
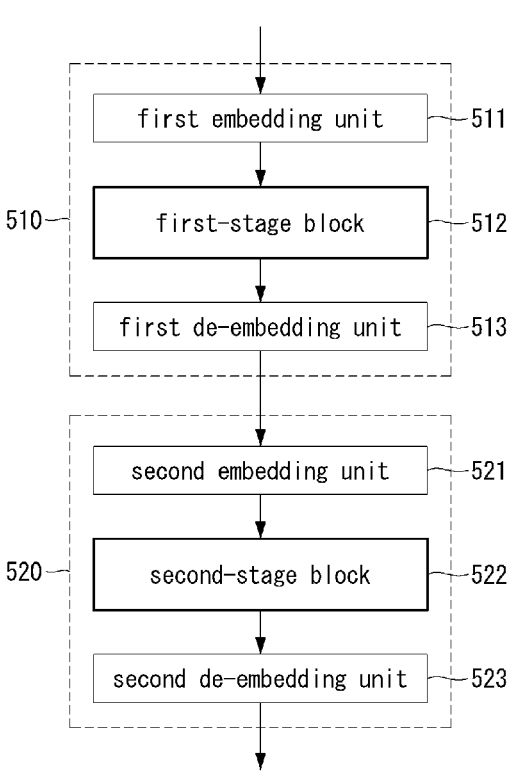
FIG. 5 is a block diagram illustrating a first exemplary embodiment of the channel estimation apparatus of FIG. 3 or 4.

FIG. 5 is a block diagram illustrating a first exemplary embodiment of the channel estimation apparatus of FIG. 3 or 4.

Referring to FIG. 5, a channel estimation apparatus of a terminal may include a denoising network 510 and an upscaling network 520. Here, the denoising network 510 may include a first embedding unit 511, a first-stage block 512, and a first de-embedding unit 513. The upscaling network 520 may include a second embedding unit 521, a second-stage block 522, and a second de-embedding unit 523. In this case, the first-stage block 512 may be a denoising block, and the second-stage block 522 may be an upscaling block.

In the above-described configuration, the first embedding unit 511 may embed channel information for each reference signal using the channel information for each reference signal, position information for each reference signal, and/or additional information to generate first latent variables having a predetermined dimension. Here, the channel information for each reference signal may have a real part and an imaginary part. The position information for each reference signal may be composed of two-dimensional position information of subcarrier(s) and a symbol index of each reference signal. The additional information may include at least one of a signal-to-noise ratio (SNR) of a signal received by the terminal from the base station, a delay spread, Doppler frequency, radio channel propagation environment, or moving speed of the terminal which is estimated from the received signal, or a combination thereof.

As described above, each reference signal may have position information composed of two-dimensional position information of subcarrier(s) and a symbol index. Accordingly, the embedded first latent variables may include the position information of each reference signal. In this case, the position information of each reference signal may be positional-encoded and added to a channel information sequence.

That is, the first embedding unit 511 may obtain a channel information sequence for each reference signal from the channel information for each reference signal, and may obtain a positional encoding value from the position information of each reference signal. In addition, the first embedding unit 511 may generate a first latent variable sequence by adding and embedding the positional encoding value of each reference signal to each channel information sequence, thereby generating the first latent variable. As described above, the terminal may generate the first latent variable sequence reflecting order information by adding the positional encoding value to the channel information sequence.

Then, the first-stage block 512 may remove noise components from the channel information of each reference signal by converting the first latent variable sequence into a first output latent variable sequence using the first artificial neural network. Here, the first artificial neural network may be an artificial neural network that has been trained to remove noise components from the channel information of the reference signal. Accordingly, the first de-embedding unit 513 may convert the first output latent variable sequence for each reference signal into channel information for each reference signal and output the converted channel information.

The second embedding unit 521 of the upscaling network 520 may form patches by bundling resources of the entire resource grid of the use band in units of a patch. Here, when the second embedding unit 521 of the upscaling network 520 forms the patches, the size of a resource block (RB) may be used as the size of patch. For example, one RB may consist of 14 symbols and 12 subcarriers as applied in the 3GPP NR system. Meanwhile, the upscaling network 520 may receive the channel information for each reference signal from which noise components have been removed by the denoising network 510. Then, the second embedding unit 521 may generate second latent variables having a predetermined dimension by patch-embedding channel information of the respective reference signals in the patches.

That is, the second embedding unit 521 may generate the second latent variables having the predetermined dimension for respective reference signals by patch-embedding the de-noised (noise-removed) channel information of the respective reference signals bundled in each patch. Then, the second embedding unit 521 may form patches by bundling resources of the entire resource grid of the use band in units of patches. Then, the second embedding unit 521 may obtain a channel information sequence for each reference signal from the de-noised channel information of each reference signal located in each patch. In addition, the second embedding unit 521 may generate the second latent variables by embedding the channel information sequence of the respective reference signals located in each patch.

In this case, each patch may have position information composed of two-dimensional position information and a symbol index. Accordingly, the embedded second latent variable may include the position information of each patch. In this case, the position information of each patch may be positional-encoded and added to the channel information sequence.

That is, the second embedding unit 521 may obtain a channel information sequence for each patch from the channel information for each patch. In addition, the second embedding unit 521 may obtain a positional encoding value from the position information of each patch. In addition, the second embedding unit 521 may generate a second latent variable sequence of each patch by adding and embedding the positional encoding value of each patch to each channel information sequence, thereby generating the second latent variables. As described above, the terminal may generate the second latent variable sequence reflecting order information by adding the positional encoding value to the channel information sequence.

The second-stage block 522 may generate channel estimation information for each patch by converting the second latent variable sequence into a second output latent variable sequence using the second artificial neural network. Accordingly, the second de-embedding unit 523 may de-embed the second output latent variable sequence for each patch and convert the second output latent variable sequence into channel information for each patch. Then, the second de-embedding unit 523 may generate channel information for the entire grid of the use band based on the channel information for each patch.

Figure 6:
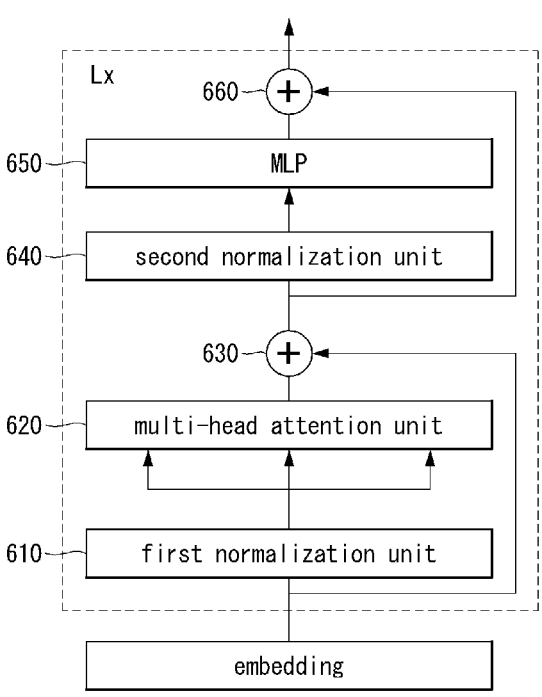
FIG. 6 is a block diagram illustrating a first exemplary embodiment of an artificial neural network.

FIG. 6 is a block diagram illustrating a first exemplary embodiment of an artificial neural network.

Referring to FIG. 6, an artificial neural network may include a first normalization unit 610, a multi-head attention unit 620, a first addition unit 630, a second normalization unit 640, a multilayer perceptron unit 650, and a second addition unit 660. The artificial neural network may be used in the first-stage block or the second-stage block of FIG. 5.

<When Used in the First-Stage Block>

The artificial neural network may be used in the first-stage block of FIG. 5, and may be trained for denoising (i.e., noise cancellation) with respect to reference signals. The first normalization unit 610 may receive the embedded first latent variables. The first normalization unit 620 may perform first normalization on the embedded first latent variables, and output first-normalized first latent variables. In this case, the first normalization unit 610 may use layer normalization, and may perform an operation as shown in Equation 1 below.

$$y = \frac{x - E[x]}{\sqrt{\mathrm{Var}\,[x] + \epsilon}} * \gamma + \beta \qquad \text{[Equation 1]}$$

Here, $\gamma$ and $\beta$ may be trainable parameters, and $\epsilon$ may be set to a sufficiently small value such as $10^{-5}$ as a value that prevents a denominator from becoming 0. x may be the first latent variable, and y may be the first-normalized first latent variable.

Then, the multi-head attention unit 620 may divide the first normalized latent variables by the number of heads. In addition, the multi-head attention unit 620 may perform self-attention operations on the first-normalized first latent variables divided by the number of heads. The self-attention operation may be a scaled dot-product operation. The multi-head attention unit 620 may perform self-attention operations as shown in Equation 2 below.

$$\text{MultiHead}\,(X_{embedding}) = Concat(\text{head}_1, \text{head}_2, \ldots, \text{head}_h) \cdot W^0 \qquad \text{[Equation 2]}$$

$$\text{head}_i = \text{Attention}\left(X_{embedding} \cdot W_i^Q, X_{embedding} \cdot W_i^K, X_{embedding} \cdot W_i^V\right)$$

$$\text{Attention}\,(Q, K, V) = \text{Softmax}\left(\frac{QK^T}{\sqrt{d_h}}\right)V$$

Here, Q, K, and V may respectively mean a query, a key, and a value of the attention operation. $d_h$ may mean a value obtained by dividing the dimension $(d_{model})$ of the first latent variables by the number h of heads. A concatenation operation (i.e., denoted as 'Concat') may be an operation for concatenating arguments. $W^O$ may be a weight of an operation for converting the output of concatenated multi-heads into the dimension of the first latent variables.

Then, the first addition unit 630 may add the output of the multi-head attention unit 620 and the first latent variables, and output a result. Here, the output of the multi-head attention unit 620 may be self-attention-operated first latent variables. Accordingly, the output of the first addition unit 630 may be first-order residual-connected first latent variables. Meanwhile, the second normalization unit 640 may perform second normalization on the output of the first addition unit 630. The second normalization unit may perform layer normalization similarly to the first normalization unit. Accordingly, the output of the second normalization unit 640 may be second-normalized and first-order residual-connected first latent variables.

Then, the multi-layer perceptron unit 650 may convert the second-normalized first-order residual-connected first latent variable into a first output latent variable sequence having a predetermined dimension by feed-forwarding the second-normalized first-order residual-connected first latent variable and using a nonlinear activation function, and output the first output latent variable sequence. Through this process, the multilayer perceptron unit 650 may remove noises from the channel information of each reference signal. The operation of the multi-layer perceptron unit 650 may be as shown in Equation 3.

$$NN0(X) = \text{Dropout}(GELU(X \cdot W_0 + b_0))$$

$$NN1(X) = \text{Dropout}(X \cdot W_1 + b_1)$$

$$MLP(X) = NN1(NN0(X)) \qquad \text{[Equation 3]}$$

Here, the operation denoted as 'Dropout' may mean an operation of removing each element of input data with a certain probability. Here, the probability may have a specific value such as 0 or 1. The function 'GELU' may be a nonlinear activation function for nonlinearly transforming an input and may be defined as in Equation 4 below.

$$GELU(x) = xP(X \le x) = x\Phi(x) = x\frac{1}{2}\left[1 + \text{erf}\left(\frac{x}{\sqrt{2}}\right)\right] \qquad \text{[Equation 4]}$$

Here, the function '$\Phi(\bullet)$' may be a cumulative distribution function (CDF) of a standard normal distribution.

Meanwhile, the second addition unit 660 may add the output of the multilayer perceptron unit 660 to the output of the first addition unit 630 and output a result. Here, the output of the first addition unit 630 may be the first-order residual-connection first latent variables. In addition, the output of the multilayer perceptron unit 660 may be the first output latent variable sequence. Accordingly, the output of the second addition unit 660 may be a residual-connected first output latent variable sequence. The artificial neural network of FIG. 6 may repeat operations of the first normalization unit, the multi-head attention unit, the first addition unit, the second normalization unit, the multilayer perceptron unit, and the second addition unit L times. Here, L may be a positive integer.

<When Used in the Second-Stage Block>

The artificial neural network may be used in the second-stage block of FIG. 5. In this case, the artificial neural network may generate channel estimation information for each patch by converting the second latent variable sequence into the second output latent variable sequence.

In this case, the first normalization unit 610 may receive the second latent variables. The first normalization unit 620 may perform first normalization on the second latent variables and output first-normalized second latent variables. In this case, the first normalization unit 610 may use layer normalization and may perform an operation similar to Equation 1. Then, the multi-head attention unit 620 may divide the first-normalized second latent variables by the number of heads. In addition, the multi-head attention unit 620 may perform self-attention operations on the first-normalized second latent variables divided by the number of heads. The self-attention operation may be a scaled dot product operation. The multi-head attention unit 620 may perform the self-attention operations as shown in Equation 2.

Then, the first addition unit 630 may add the output of the multi-head attention unit 620 and the second latent variable and output a result. Here, the output of the multi-head attention unit 620 may be the self-attention-operated second latent variables. Accordingly, the output of the first addition unit 630 may be the first-order residual-connected second latent variables. Meanwhile, the second normalization unit 640 may perform second normalization on the output of the first addition unit 630. The second normalization unit may perform layer normalization similarly to the first normalization unit. Accordingly, the output of the second normalization unit 640 may be the second-normalized first-order residual-connected second latent variables.

Thereafter, the multilayer perceptron unit 650 may convert the first-order residual-connected second latent variable into a second output latent variable sequence having a predetermined dimension by feed-forwarding the first-order residual-connected second latent variable and using a non-linear activation function, and output the second output latent variable sequence. Through this process, the multi-layer perceptron unit 650 may generate channel estimation information for each patch. The operation of the multi-layer perceptron unit 650 may be as shown in Equation 3.

Meanwhile, the second addition unit 660 may add the output of the multilayer perceptron unit 660 to the output of the first addition unit 630 and output a result. Here, the output of the first addition unit 630 may be the first-order residual-connected second latent variables. In addition, the output of the multi-layer perceptron unit 660 may be the second output latent variable sequence. Therefore, the output of the second addition 660 may be the residual-connected second output latent variable sequence.

On the other hand, the multi-head attention unit performs operations targeting all latent variable elements, so computational complexity may be high.

Figure 7:
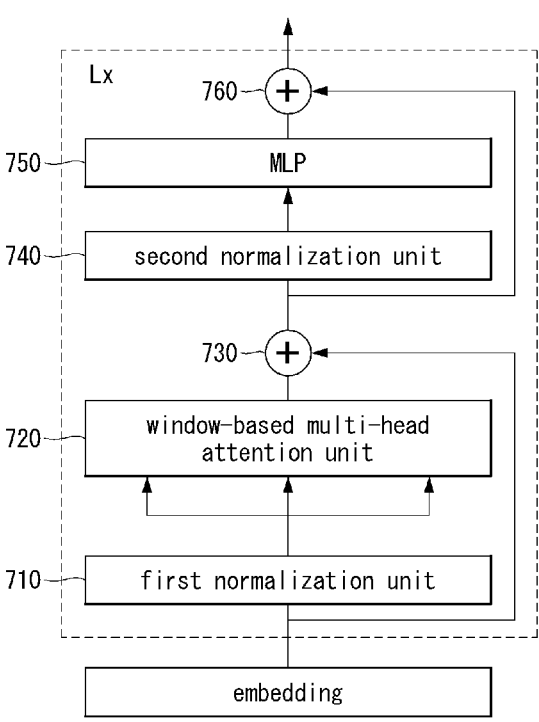
FIG. 7 is a block diagram illustrating a second exemplary embodiment of an artificial neural network.

FIG. 7 is a block diagram illustrating a second exemplary embodiment of an artificial neural network.

Referring to FIG. 7, an artificial neural network may include a first normalization unit 710, a window-based multi-head attention unit 720, a first addition unit 730, a second normalization unit 740, a multilayer perceptron unit 750, and a second addition unit 760. The first normalization unit 710, the first addition unit 730, the second normalization unit 740, the multilayer perceptron unit 750, and the second addition unit 760 may operate identically to the corresponding units described in FIG. 6, and thus a detailed description thereon is omitted.

Here, the window-based multi-head attention unit 720 may perform a multi-head attention operation by dividing the number of latent variables by a window size W. Here, W may be a positive integer.

Figure 8:
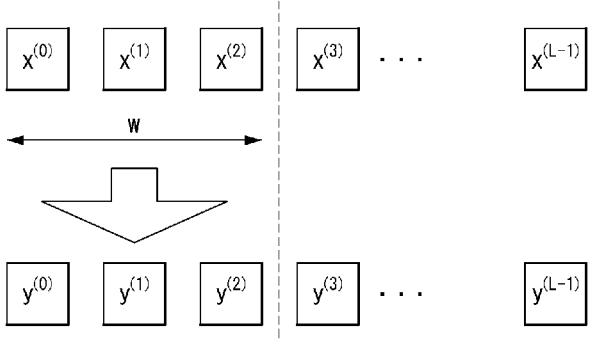
FIG. 8 is a conceptual diagram illustrating a first exemplary embodiment of a processing procedure of a window-based multi-head attention unit.

FIG. 8 is a conceptual diagram illustrating a first exemplary embodiment of a processing procedure of a window-based multi-head attention unit.

Referring to FIG. 8, the number of latent variables may be L. Here, L may be a positive integer. In this situation, the respective latent variables may be expressed as x(0) to x(L−1). The window-based multi-head attention unit may divide the latent variables into a plurality of latent variable groups using a window having a size of W. In this case, the number of latent variable groups may be L/W. Thereafter, the window-based multi-head attention unit may perform multi-head attention operations using the respective latent variable groups as unit inputs. Here, the window-based multi-head attention unit may independently perform multi-head attention operation as many times as the number of latent variable groups. In addition, the window-based multi-head attention unit may reassemble the results of the multi-head attention operations performed on the divided latent variable groups and output self-attention-operated latent variables as final outputs. In this case, the self-attention-operated first latent variables may be expressed as y(0) to y(L−1).

Figure 9:
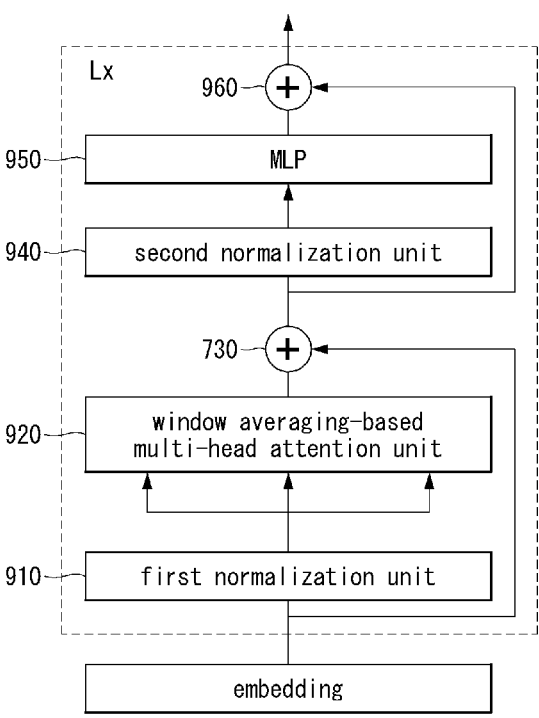
FIG. 9 is a block diagram illustrating a third exemplary embodiment of an artificial neural network.

FIG. 9 is a block diagram illustrating a third exemplary embodiment of an artificial neural network.

Referring to FIG. 9, an artificial neural network may include a first normalization unit 910, a window averaging-based multi-head attention unit 920, a first addition unit 930, a second normalization unit 940, a multilayer perceptron unit 950, and a second addition unit 960. Here, the first normalization unit 910, the first addition unit 930, the second normalization unit 940, the multilayer perceptron unit 950, and the second addition unit 960 may operate identically to the corresponding units described in FIG. 6, and thus a detailed description thereon is omitted.

Here, the window averaging-based multi-head attention unit 920 may perform multi-head attention operations by dividing the number of latent variables by the window size W and taking an average of the latent variables within the divided window size.

Figure 10:
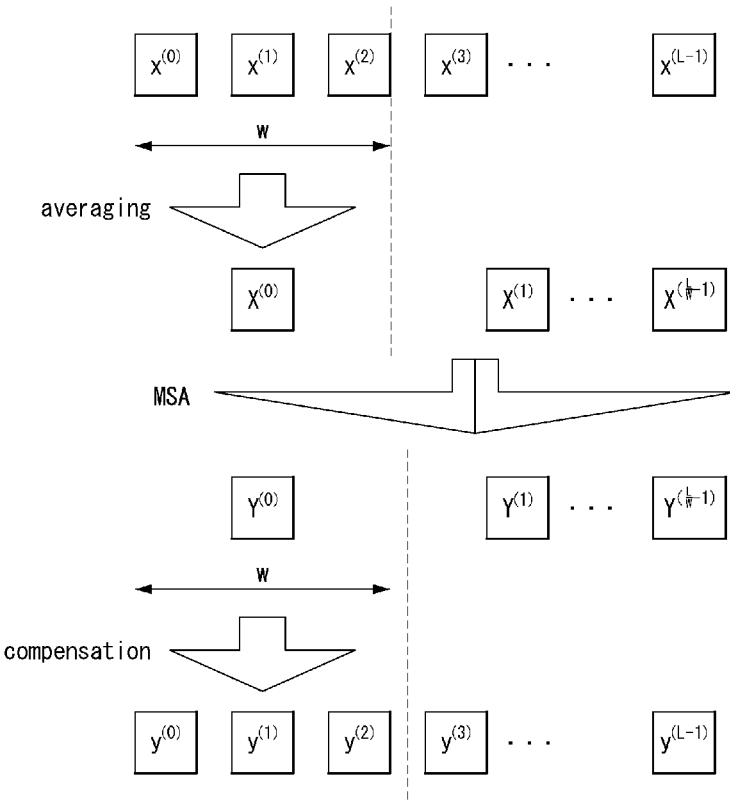
FIG. 10 is a conceptual diagram illustrating a first exemplary embodiment of a processing procedure of a window averaging-based multi-head attention unit.

FIG. 10 is a conceptual diagram illustrating a first exemplary embodiment of a processing procedure of a window averaging-based multi-head attention unit.

Referring to FIG. 10, the number of latent variables may be L. Here, L may be a positive integer. The respective latent variables may be expressed as x(0) to x(L−1). The window averaging-based multi-head attention unit may divide the latent variables into latent variable groups using a window size W. W may be a positive integer.

Thereafter, the window averaging-based multi-head attention unit may generate one average latent variable by obtaining an average of latent variables belonging to each latent variable group. As a result, the window averaging-based multi-head attention unit may generate as many average latent variables as the number of latent variable groups. In this case, the average latent variables may be expressed as X(0) to X(L/W−1). Thereafter, the window averaging-based multi-head attention unit may perform multi-head attention operations using the average latent variables as inputs.

In addition, the window averaging-based multi-head attention unit may perform compensation on results of the multi-head attention operations performed on the average latent variables, and output self-attention-operated latent variables as final outputs. In this case, the self-attention-operated first latent variables may be expressed as y(0) to y(L−1).

In this case, Y(0) to Y(L/W−1), which are results of the multi-head attention operations, may be as shown in Equation 5.

$$y(k)=x(k)+(Y(K)−X(K)) \hfill \text{[Equation 5]}$$

Here, K is an index of the average latent variable corresponding to an index k of the latent variable, and may be obtained as ⌊k/W⌋. K and k may be positive integers. Here, ⌊•⌋ can mean an integer that does not exceed the value in parentheses.

Figure 11:
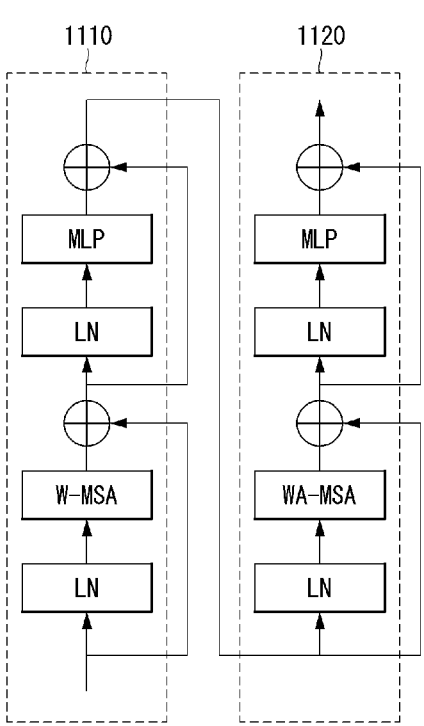
FIG. 11 is a block diagram illustrating a fourth exemplary embodiment of an artificial neural network.

FIG. 11 is a block diagram illustrating a fourth exemplary embodiment of an artificial neural network.

Referring to FIG. 11, an artificial neural network may include a first-layer artificial neural network 1110 and a second-layer artificial neural network 1120. Here, the first-layer artificial neural network may be the artificial neural network of FIG. 7, and the second-layer artificial neural network may be the artificial neural network of FIG. 9. Accordingly, the artificial neural network may be obtained by concatenating the artificial neural network of FIG. 7 and the artificial neural network of FIG. 9. Here. operations of the first-layer artificial neural network may be the same as those of the artificial neural network of FIG. 7, and operations of the second-layer artificial neural network may be the same as those of the artificial neural network of FIG. 9.

Figure 12:
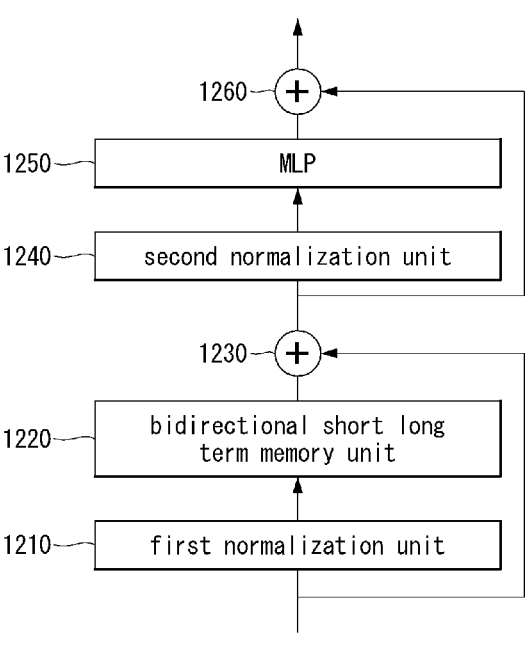
FIG. 12 is a block diagram illustrating a fifth exemplary embodiment of an artificial neural network.

FIG. 12 is a block diagram illustrating a fifth exemplary embodiment of an artificial neural network.

Referring to FIG. 12, an artificial neural network may include a first normalization unit 1210, a bidirectional long short term memory (bi-LSTM) 1220, a first addition unit 1230, a second normalization unit 1240, a multilayer perceptron unit 1250, and a second addition unit 1260.

The first normalization unit 1210, the first addition unit 1230, the second normalization unit 1240, the multilayer perceptron unit 1250, and the second addition unit 1260 may operate identically to the corresponding units described in FIG. 6, and thus a detailed description thereon is omitted. The bidirectional LSTM 1220 may perform long-short-term memory (LSTM) operations on latent variables in both forward and backward directions. The LSTM operations may be as shown in Equation 6 below.

$$i_t = \sigma(W_{ii}x_t + b_{ii} + W_{hi}h_{t-1} + b_{hi})$$

$$f_t = \sigma(W_{if}x_t + b_{if} + W_{hf}h_{t-1} + b_{hf})$$

$$g_t = \tan h(W_{ig}x_t + b_{ig} + W_{hg}h_{t-1} + b_{hg})$$

$$o_t = \sigma(W_{io}x_t + b_{io} + W_{ho}h_{t-1} + b_{ho})$$

$$c_t = f_t \odot c_{t-1} + i_t \odot g_t$$

$$h_t = o_t \odot \tan h(c_t) \qquad \text{[Equation 6]}$$

In Equation 6, h t may be a hidden state at a time t, c t may be a cell state at the time t, and x t may be an input at the time t. A time of a starting point may be initialized to 0. Here, $i_t$, $f_t$, $g_t$, and $o_t$ may be an input gate, a pocket gate, a cell gate, and an output gate, respectively. The function '$\sigma(\cdot)$' may be a sigmoid function, and the operation '$\odot$' may be a Hadamard product. Elements of the matrixes $W_{ii}$, $W_{hi}$, $W_{if}$, $W_{hf}$, $W_{ig}$, $W_{hg}$, $W_{io}$, and $W_{ho}$ and the vectors $b_{ii}$, $b_{hi}$, $b_{if}$, $b_{hf}$, $b_{ig}$, $b_{hg}$, $b_{io}$, and $b_{ho}$ may be trainable parameters.

Figure 13:
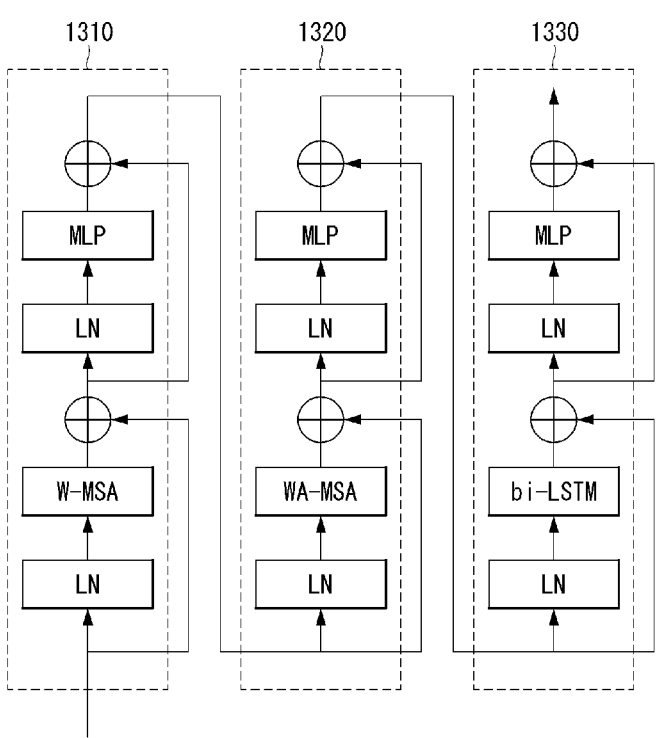
FIG. 13 is a block diagram illustrating a sixth exemplary embodiment of an artificial neural network.

FIG. 13 is a block diagram illustrating a sixth exemplary embodiment of an artificial neural network.

Referring to FIG. 13, an artificial neural network may include a first-layer artificial neural network 1310, a second-layer artificial neural network 1320, and a third-layer artificial neural network 1330. Here, the first-layer artificial neural network may be the artificial neural network of FIG. 7, the second-layer artificial neural network may be the artificial neural network of FIG. 9, and the third-layer artificial neural network may be the artificial neural network of FIG. 12. Accordingly, the artificial neural network may be obtained by concatenating the artificial neural network of FIG. 7, the artificial neural network of FIG. 9, and the artificial neural network of FIG. 12. Here, operations of the first-layer artificial neural network may be the same as those of the artificial neural network of FIG. 7, operations of the second-layer artificial neural network may be the same as those of the artificial neural network of FIG. 9, and operations of the third-layer artificial neural network may be the same as those of the artificial neural network of FIG. 12.

As described above, the artificial neural network may have a structure in which the artificial neural network of FIG. 7, the artificial neural network of FIG. 10, and the artificial neural network of FIG. 12 are repeatedly concatenated N1 times. Here, N1 may be a positive integer.

Figure 14:
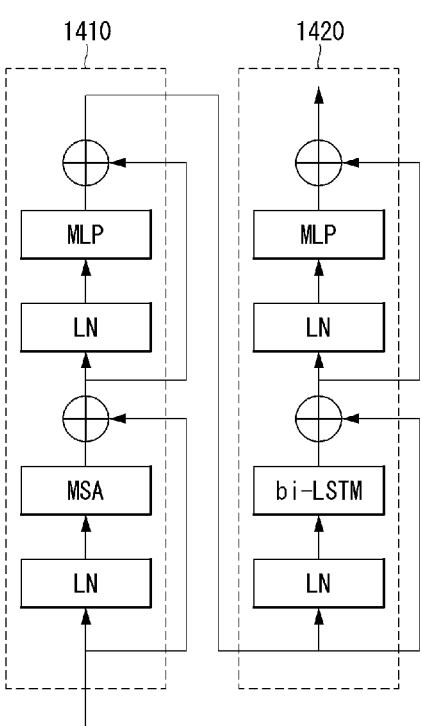
FIG. 14 is a block diagram illustrating a seventh exemplary embodiment of an artificial neural network.

FIG. 14 is a block diagram illustrating a seventh exemplary embodiment of an artificial neural network.

Referring to FIG. 14, an artificial neural network may include a first-layer artificial neural network 1410 and a second-layer artificial neural network 1420. Here, the first-layer artificial neural network may be the artificial neural network of FIG. 6, and the second-layer artificial neural network may be the artificial neural network of FIG. 12. Accordingly, the artificial neural network may be obtained by concatenating the artificial neural network of FIG. 6 and the artificial neural network of FIG. 12. Here, operations of the first-layer artificial neural network may be the same as those of the artificial neural network of FIG. 6, and operations of the second-layer artificial neural network may be the same as those of the artificial neural network of FIG. 12.

As described above, the artificial neural network may have a structure in which the artificial neural network of FIG. 6 and the artificial neural network of FIG. 12 are repeatedly concatenated N2 times. Here, N2 may be a positive integer.

Meanwhile, the first-stage block of FIG. 5 may be at least one of the artificial neural network of FIG. 6 (i.e., basic transformer encoder), the artificial neural network of FIG. 7 (i.e., first modified transformer encoder), the artificial neural network of FIG. 9 (i.e., second modified transformer encoder), or the artificial neural network of FIG. 12 (i.e., third modified transformer encoder). Alternatively, the first-stage block of FIG. 5 may be a combination of at least two of the artificial neural network of FIG. 6 (i.e., basic transformer encoder), the artificial neural network of FIG. 7 (i.e., first modified transformer encoder), the artificial neural network of FIG. 9 (i.e., second modified transformer encoder), or the artificial neural network of FIG. 12 (i.e., third modified transformer encoder). For example, the first-stage block of FIG. 5 may be at least one of the artificial neural network of FIG. 11 (i.e., first combinational transformer encoder), the artificial neural network of FIG. 13 (i.e., second combinational transformer encoder), or the artificial neural network of FIG. 14 (i.e., third combinational transformer encoder). In particular, the first-stage block may be the artificial neural network of FIG. 11 or 12.

In addition, the second-stage block of FIG. 5 may be at least one of the artificial neural network of FIG. 6 (i.e., basic transformer encoder), the artificial neural network of FIG. 7 (i.e., first modified transformer encoder), the artificial neural network of FIG. 9 (i.e., second modified transformer encoder), or the artificial neural network of FIG. 12 (i.e., third modified transformer encoder). Alternatively, the second-stage block of FIG. 5 may be a combination of at least two of the artificial neural network of FIG. 6 (i.e., basic transformer encoder), the artificial neural network of FIG. 7 (i.e., first modified transformer encoder), the artificial neural network of FIG. 9 (i.e., second modified transformer encoder), or the artificial neural network of FIG. 12 (i.e., third modified transformer encoder). For example, the second-stage block of FIG. 5 may be at least one of the artificial neural network of FIG. 11 (i.e., first combinational transformer encoder), the artificial neural network of FIG. 13 (i.e., second combinational transformer encoder), or the artificial neural network of FIG. 14 (i.e., third combinational transformer encoder). In particular, the second-stage block may be the artificial neural network of FIG. 14.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a receiver, comprising:
receiving reference signals from a transmitter in an entire use band;
generating first channel information by performing channel estimation on each of the reference signals;
generating second channel information by removing noises from the first channel information using a first artificial neural network; and
generating third channel information for a grid of the entire use band based on the second channel information using a second artificial neural network.

2. The operation method according to claim 1, further comprising: receiving data transmitted from the transmitter using the third channel information.

3. The operation method according to claim 1, wherein the generating of the second channel information comprises:
generating first latent variables of the reference signals by embedding the first channel information for each of the reference signals and position information for each of the reference signals, the first latent variables having a predetermined dimension;
removing noises from the first channel information by converting the first latent variables of the reference signals into first output latent variables using the first artificial neural network; and
generating the second channel information from the first output latent variables.

4. The operation method according to claim 3, wherein the generating of the first latent variables comprises:
obtaining a channel information sequence for each of the reference signals from the first channel information for each of the reference signals;
obtaining a positional encoding value from the position information for each of the reference signals; and
generating the first latent variables by adding and embedding the positional encoding value to the channel information sequence.

5. The operation method according to claim 3, wherein the first latent variables are generated with reference to additional information, and the additional information includes at least one of a signal-to-noise ratio (SNR) of a signal received by the receiver from the transmitter, a delay spread, a Doppler frequency, a radio channel propagation environment, or a moving speed of the receiver which is estimated from the received signal, or a combination thereof.

6. The operation method according to claim 3, wherein the removing of the noises from the first channel information comprises:
generating self-attention-operated first latent variables by performing self-attention operations on the first latent variables using the first artificial neural network;
generating residual-connected first latent variables by adding the self-attention-operated first latent variables and the first latent variables using the first artificial neural network;
generating the first output latent variables by feed-forwarding the residual-connected first latent variables through a nonlinear activation function using the first artificial neural network, thereby removing noises from the first channel information; and
generating residual-connected first output latent variables by adding the residual-connected first latent variables and the first output latent variables using the first artificial neural network.

7. The operation method according to claim 6, wherein the generating of the self-attention-operated first latent variables comprises:
dividing the first latent variables into a plurality of latent variable groups using a window; and
generating the self-attention-operated first latent variables by performing self-attention operations with the respective plurality of latent variable groups as unit inputs using the first artificial neural network.

8. The operation method according to claim 6, wherein the generating of the self-attention-operated first latent variables comprises:
dividing the first latent variables into a plurality of latent variable groups using a window;
generating average latent variables based on averages of the respective plurality of latent variable groups;
generating self-attention-operated average latent variables by performing self-attention operations on the average latent variables using the first artificial neural network; and generating the self-attention-operated first latent variables by performing compensation on the self-attention-operated average latent variables.

9. The operation method according to claim 3, wherein the removing of the noises from the first channel information comprises:

generating long short term memory (LSTM)-operated first latent variables by performing LSTM operations on the first latent variables in both forward and backward directions using the first artificial neural network;

generating residual-connected first latent variables by adding the LSTM-operated first latent variables and the first latent variables using the first artificial neural network;

generating the first output latent variables by feed-forwarding the residual-connected first latent variables through a nonlinear activation function using the first artificial neural network, thereby removing noises from the first channel information; and generating residual-connected first output latent variables by adding the residual-connected first latent variables and the first output latent variables using the first artificial neural network.

10. The operation method according to claim 1, wherein the generating of the third channel information comprises:

dividing the grid of the entire use band into patches;

generating second latent variables of the patches by embedding the noise-removed second channel information and position information for each of the patches in units of a patch, the second latent variables having a predetermined dimension;

generating channel information of the patches by converting the second latent variables into second output latent variables using the second artificial neural network; and generating the third channel information for the grid by de-embedding the second output latent variables.

11. The operation method according to claim 10, wherein the generating of the second latent variables comprises:

obtaining a channel information sequence for each of the patches from the second channel information for each of the patches;

obtaining a positional encoding value from the position information for each of the patches; and generating the second latent variables by adding and embedding the positional encoding value to the channel information sequence.

12. The operation method according to claim 10, wherein the generating of the channel information of each of the patches comprises:

generating self-attention-operated second latent variables by performing self-attention operations on the second latent variables using the second artificial neural network;

generating residual-connected second latent variables by adding the self-attention-operated second latent variables and the second latent variables using the second artificial neural network; and generating the second output latent variables by feed-forwarding the residual-connected second latent variables through a nonlinear activation function using the second artificial neural network, thereby generating the channel information of each of the patches.

13. The operation method according to claim 10, wherein the generating of the channel information of each of the patches comprises:

generating LSTM-operated second latent variables by performing LSTM operations on the second latent variables in both forward and backward directions using the second artificial neural network;

generating residual-connected second latent variables by adding the LSTM-operated second latent variables and the second latent variables using the second artificial neural network; and generating the second output latent variables by feed-forwarding the residual-connected second latent variables through a nonlinear activation function using the second artificial neural network, thereby generating the channel information of each of the patches.

14. A receiver comprising a processor, wherein the processor causes the receiver to perform:

receiving reference signals from a transmitter in an entire use band;

generating first channel information by performing channel estimation on each of the reference signals;

generating second channel information by removing noises from the first channel information using a first artificial neural network; and generating third channel information for a grid of the entire use band based on the second channel information using a second artificial neural network.

15. The receiver according to claim 14, wherein in the generating of the second channel information, the processor further causes the receiver to perform:

generating first latent variables of the reference signals by embedding the first channel information for each of the reference signals and position information for each of the reference signals, the first latent variables having a predetermined dimension;

removing noises from the first channel information by converting the first latent variables of the reference signals into first output latent variables using the first artificial neural network; and generating the second channel information from the first output latent variables.

16. The receiver according to claim 15, wherein in the removing of the noises from the first channel information, the processor further causes the receiver to perform:

generating self-attention-operated first latent variables by performing self-attention operations on the first latent variables using the first artificial neural network;

generating residual-connected first latent variables by adding the self-attention-operated first latent variables and the first latent variables using the first artificial neural network;

generating the first output latent variables by feed-forwarding the residual-connected first latent variables through a nonlinear activation function using the first artificial neural network, thereby removing noises from the first channel information; and generating residual-connected first output latent variables by adding the residual-connected first latent variables and the first output latent variables using the first artificial neural network.

17. The receiver according to claim 16, wherein in the generating of the self-attention-operated first latent variables, the processor further causes the receiver to perform:

dividing the first latent variables into a plurality of latent variable groups using a window; and generating the self-attention-operated first latent variables by performing self-attention operations with the respective plurality of latent variable groups as unit inputs using the first artificial neural network.

18. The receiver according to claim 16, wherein in the generating of the self-attention-operated first latent variables, the processor further causes the receiver to perform:

dividing the first latent variables into a plurality of latent variable groups using a window;

generating average latent variables based on averages of the respective plurality of latent variable groups;

generating self-attention-operated average latent variables by performing self-attention operations on the average latent variables using the first artificial neural network; and generating the self-attention-operated first latent variables by performing compensation on the self-attention-operated average latent variables.

19. The receiver according to claim 15, wherein in the removing of the noises from the first channel information, the processor further causes the receiver to perform:

generating long short term memory (LSTM)-operated first latent variables by performing LSTM operations on the first latent variables in both forward and backward directions using the first artificial neural network;

generating residual-connected first latent variables by adding the LSTM-operated first latent variables and the first latent variables using the first artificial neural network;

generating the first output latent variables by feed-forwarding the residual-connected first latent variables through a nonlinear activation function using the first artificial neural network, thereby removing noises from the first channel information; and generating residual-connected first output latent variables by adding the residual-connected first latent variables and the first output latent variables using the first artificial neural network.

20. The receiver according to claim 14, wherein in the generating of the third channel information, the processor further causes the receiver to perform:

dividing the grid of the entire use band into patches;

generating second latent variables of the patches by embedding the noise-removed second channel information and position information for each of the patches in units of a patch, the second latent variables having a predetermined dimension;

generating channel information of the patches by converting the second latent variables into second output latent variables using the second artificial neural network; and generating the third channel information for the grid by de-embedding the second output latent variables.

\* \* \* \* \*